June 23, 1936.  N. M. ROSENDAHL  2,045,026
BEARING AND OILING SYSTEM THEREFOR
Filed Aug. 9, 1933
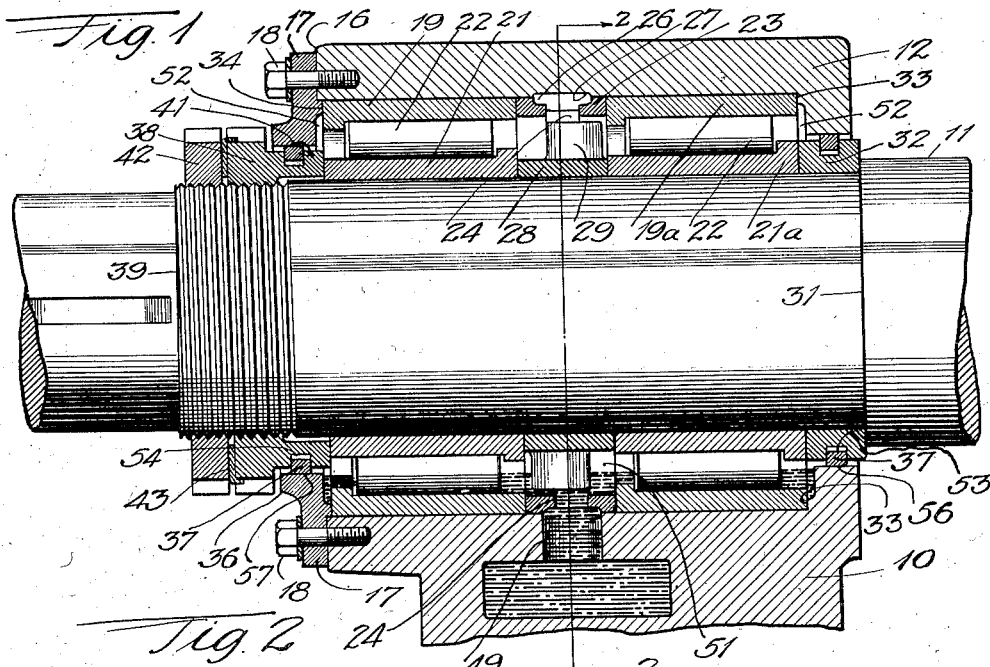
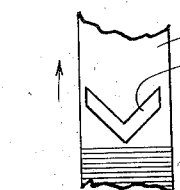
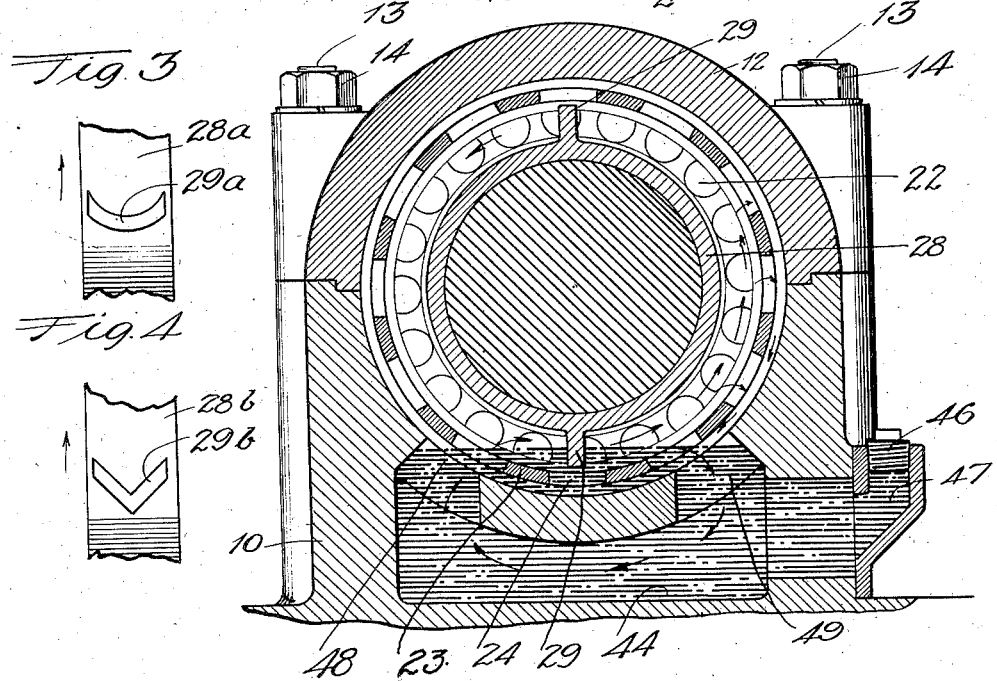
INVENTOR
NILS M. ROSENDAHL,
BY Flournoy Corey
ATTORNEY Patented June 23, 1936

2,045,026

UNITED STATES PATENT OFFICE 2,045,026

BEARING AND OILING SYSTEM THEREFOR

Nils M. Rosendahl, Cedar Rapids, Iowa, assignor to Universal Crusher Company, Cedar Rapids, Iowa, a corporation of Delaware Application August 9, 1933, Serial No. 684,369

5 Claims. (Cl. 308—127)

This invention relates to a combined bearing structure and oiling system.

It is well known in the art of rotatably supporting shafts and the like that roller and ball bearings are preferable over sleeve bearings and similar structures by reason of their lower friction loss in starting and running, and their long life, if properly constructed, but it has been found to be very difficult to utilize roller or ball bearing structures where loads are heavy and where heavy twisting moments are applied to the shaft.

If the shaft, such as the shaft used in crushers and the like, is subjected to considerable variation in torque, as for instance the sudden variation which occurs when a loose dipper tooth from a shovel accidentally finds its way into the crusher, the shaft may twist sufficiently to break the bearings, or the sudden increase in radial load on the shaft may break them. Bearings of this type are very expensive and therefore breakage, even if it does not ruin the machine, will necessitate expensive replacements of the parts of the bearing.

The problem of properly oiling and cooling a bearing under heavy loads is also a difficult one. The temperature of the oil may be so low that the oil does not flow readily, and consequently the bearing may be ruined because of the lack of an oil film, or the temperature of the oil may become so high that the oil film becomes very thin and does not afford proper protection for the parts of the bearing and the shaft. The races of such bearings may become loose and play of the shaft and parts of the bearing may soon ruin the bearing. The sealing of the bearing against excessive discharge of lubricant affords another problem and while successful bearing structures have been developed, their cost is usually excessive and they may not be able to withstand sudden increases in load and like abnormal conditions.

I have observed these difficulties and have devised a bearing structure and oiling system which overcome the difficulties above pointed out and which can withstand the abnormal conditions sometimes encountered.

A general object of my invention is to provide a new and novel bearing structure and an oiling system for such a structure.

A more specific object of my invention is to provide a bearing arranged to utilize two sets of anti-friction bearings so that the shaft may be supported along a relatively large part of its length and to lock the parts of these bearings securely in place so that destructive play cannot develop.

Another object of my invention is to provide means for circulating the oil over all the parts of the bearing and for cooling the oil.

Another object of my invention is to provide means for sealing the ends of the bearing to prevent the excessive discharge of lubricant from the bearing.

Other and further features and objects of my invention will be more apparent to those skilled in the art upon a consideration of the accompanying drawing and following specification, wherein is disclosed an exemplary embodiment of the invention, with the understanding, however, that such changes may be made therein as fall within the scope of the appended claims without departing from the spirit of the invention.

In said drawing:

Figure 1 is a view partly in elevation and partly in irregular section, of a device constructed according to my invention. The base, cap, and bearing parts are shown in section for the purpose of better illustration.

Figure 2 is a view in section of the device shown in Figure 1 and taken along the line 2—2 of the figure.

Figure 3 is an elevational view of a portion of a modified means for circulating the oil of a bearing constructed according to my invention, and Figure 4 is a view in elevation of a portion of still another modification of the oil circulating or pumping means.

Referring to the drawing, there is shown at 10, generally, the upper portion of a pedestal for supporting one end of a shaft such as the shaft 11. In outward appearance, the pedestal is of usual construction and may be shaped in accordance with common practice. The interior of the upper end of the pedestal is hollowed out in an unusual manner to provide an oil sump and channels through which the oil may be circulated, and this structure, together with the means for holding the parts of the bearings in place and for sealing the bearings, will be hereinafter more particularly described.

The semi-cylindrical cap 12 is in general of the usual form and is adapted to be clamped to the pedestal by means of bolts 13 and nuts 14.

One face of the pedestal and cap is machined off as indicated at 16, to provide a smooth flat surface, as shown at the left of Figure 1, and a ring 17 of peculiar cross-sectional form may be clamped to the smooth face by means of bolts 18.

In order to support the shaft throughout a relatively long portion of its length inside the bearing, two or more sets of roller bearings are preferably employed. It is preferable that two sets of bearings be employed so that if the shaft is subjected to unusual torque, one bearing may turn slightly further than the other to prevent shearing of the rollers and of the bearing parts. The bearings themselves are of usual construction and are comprised of an outer or stationary ring or race 19 and an inner or rotating shaft-ring or race 21 on which rollers 22 may roll. Roller bearings are preferably employed because they furnish a line contact for carrying the excessive loads imposed. By utilizing two or more sets of bearings, better opportunity is afforded for introducing oil into the bearings by means hereinafter more particularly described.

The stationary races are spaced apart by means of a ring 23, the outside diameter of which is such that it is a close fit within the inner wall of the base or pedestal 10 and the cap 12. The ring 23 is provided with a plurality of radial openings 24 and these openings are enlarged and connected on the outer wall of the ring, as indicated at 26, in order to afford a channel entirely around the outside wall of the ring to permit oil to flow around the ring. The inner wall of the base 10 and cap 12 is provided with a corresponding groove, indicated at 27, for enlarging this channel.

The moving races 21 are separated by means of a ring 28 which is a close fit on the shaft 11, and the ring 28 is provided with one or more paddles 29 for the purpose of pumping oil to the bearings. These paddles are preferably staggered as shown so that one paddle will throw the oil to one bearing and the other paddle will throw the oil to the other bearing. Within this construction, only a part of the oil in the sump is disturbed by each succeeding paddle and the oil may therefore more readily flow back into the central portion of the base after a paddle has passed. By staggering the paddles, disturbance of the oil at one point occurs only once in every revolution of the shaft.

A shoulder is provided on the shaft, as indicated at 31, and a sealing or packing ring 32 encircles the shaft and abuts against the shoulder 31. Another shoulder 33 is provided in the base and cap and the stationary race 19a abuts against this shoulder. The rotating race 21a abuts against the ring 32.

The ring 17 is provided with an inwardly extending shoulder indicated at 34, and this shoulder bears against the left or outermost face of the stationary ring 19. It is apparent that, if the widths of the races 19 and 19a and of the ring 23 are properly chosen and the bolts 18 screwed down tightly, the shoulder 34 of the ring 17 will clamp the stationary races and ring tightly together and hold them in place.

The inner face of the ring 17 is provided with an enlarged, longitudinally-extending, flange 36 to provide a bearing face for a sealing ring 37, and the other ends of the base 10 and cap 12 are faced off smoothly for the same purpose.

A locking ring 38 is engaged on the shaft by means of the threads 39 and this locking ring is provided with an inwardly extending flange portion 41 which abuts against the outer face of the race 21 to drive it against the ring 28 to lock the race 21a in place against ring 32. It is apparent that, if the dimensions of the rings 32 and 28 are properly chosen and the locking ring 38 is screwed home, the rotating races 21 and 21a will be locked in place to prevent any motion on the shaft. The locking ring 38 is locked in turn by means of a second locking ring 42 which is threaded tightly against the first locking ring and secured by means of a lock washer 43.

It is apparent that, by means of the structure just described, both the stationary and rotating races are locked against any movement in the base or cap or on the shaft. By this means destructive play of the shaft in the bearings is prevented.

The base 10 is hollowed out, as indicated at 44, to provide a relatively large oil sump. The sump may be filled with oil by unscrewing the plug 46 and pouring oil into the filler conduit 47 until the oil reaches the top of the conduit. Channels 48 and 49 are provided in the base on the opposite sides of the vertical axis of the bearing to permit oil to flow up into the lower portion of the chamber 51 in which the bearings revolve. The openings 24 in ring 23 permit the oil to flow up inside the ring 23 where the paddles 29 may dip into the oil when the shaft is rotating and throw it into the bearing. The oil is thrown first to one side and then to the other, is carried around by the rollers and other rotating parts, and may flow back into the sump through the spaces 52 at either end of the bearing. The oil may also flow into the channel provided by the grooves 24 and 26 and back into the sump. The direction of movement of the oil, when the shaft is rotating in a counter-clockwise direction, is shown in Figure 2. Of course, if the shaft is rotating in the opposite direction, the direction of the flow of the oil will be reversed.

It is very desirable in structures of this kind that adequate means be provided for preventing the flow of oil from the ends of the bearing and, in order to secure adequate sealing means, I preferably cut grooves in the rings 32 and 38 as indicated at 53 and 54, respectively. In assembling the shaft in the bearing, the rings 37 are inserted in the grooves and, after the shaft is in place, the rings expand outwardly so that they closely engage the faces 56 of the base and cap and the face 57 of the ring. The friction caused by expansion of these rings prevents them from rotating, and the rotation of the rings 32 and 38 soon provides a tight lap-joint between the rings 37 and the lock ring 38 and clamp ring 32. This lap joint is very effective in preventing the discharge of oil from the bearing. The rings 37 may be of any desired material such as steel, iron, leather, rubber, or the like.

It is customary to permit slight end play of the races on the rollers, and the rings 37 may move slightly in a longitudinal direction over the faces 56 and 57 to accommodate any slight end play or expansion and contraction of the shaft.

The paddles 29, shown in Figures 1 and 2, are merely flat paddle-like members whose chief purpose is to throw the oil to one side or the other to force it into the bearings. If it is desired to carry more oil up into the cap, I may utilize paddles which are shaped as shown in Figures 3 or 4. The paddle 29a, shown in Figure 3, is cupped for the purpose of carrying more oil to the upper central part of the bearing. The paddle 29b, shown in Figure 4, is formed with flat sloping sides, and this form of paddle will carry more oil than the paddle 29a and the distribution or discharge of oil from the paddle will be different. It is apparent that, by utilizing various form of paddles and by using one or several paddles, the oil may be carried up into the bearing and driven into the rotating parts of the bearing as desired.

While the device embodying my invention has been shown and described in connection with roller bearings, it is apparent that the same or a similar structure may be employed which utilizes ball bearings or even suitable sleeve bearings, therefore, it is to be understood that while the words "roller bearings" may be used in the specification and claims the term is to be taken in a broad sense to include ball bearings and the like.

It is apparent that modifications of my invention may be made by those skilled in the art. Such modifications may be made without departing from the spirit and scope of the invention as set forth in the appended claims.

I claim as my invention:

1. In a shaft bearing including a base having an oil reservoir therein, a cap, a spacer ring in the base and cap having radial openings therethrough, a shaft, bearings on the shaft, and paddle means on the shaft adapted for rotation adjacent the radial openings in the spacer ring for drawing oil from the reservoir and driving it longitudinally of the shaft to lubricate the bearings.

2. In a shaft bearing including a base having an oil reservoir therein, a pair of bearings in the base, a shaft mounted for rotation in the bearings, a spacer ring for spacing the bearings apart having radial openings therethrough, the base having a pair of radially disposed channels communicating with the oil reservoir and the radial openings in the spacer ring, and pump means on the shaft mounted for rotation adjacent the openings of the ring for drawing oil out of the reservoir through one of the channels of the base and through some of the openings of the spacer ring, and the other channel and other openings of the ring being so disposed as to permit oil to flow back from the bearings into the oil reservoir.

3. In a shaft lubricating structure, a base having an oil sump therein and having a channel to permit oil to flow up into the space directly below the shaft, a spacer ring having a channel around its outside periphery and having openings therethrough whereby oil from the shaft may flow through the openings and through the channel about the periphery, paddle means on the shaft for throwing oil which is collected directly beneath the shaft, and the spacer ring having other openings, and the base having another channel, whereby oil draining from the channels in the spacer ring may flow back into the sump in the base of the bearing.

4. In an oiling system for shaft bearings, means mounted on the shaft for rotation having paddles substantially narrower than said means mounted in staggered sequence about the shaft whereby one paddle, in passing through the oil sump will scoop out a path through the oil at one side of the sump and throw the oil to that side and the next paddle will scoop out the oil at the other side and throw it to that side to cause a surging of oil from one side to the other to deliver oil first in one direction parallel to the shaft and then in the other direction parallel to the shaft.

5. In an oiling system for shaft bearings, at least two bearings, a ring having paddles substantially narrower than said ring mounted on the shaft for rotation therewith, the paddles being mounted on the ring between the bearings in staggered sequence about the ring whereby the paddles feed oil to one bearing and then to the other by reason of their proximity to one or the other bearings.

NILS M. ROSENDAHL.